US008826437B2

(12) United States Patent
Hershey et al.

(10) Patent No.: US 8,826,437 B2
(45) Date of Patent: Sep. 2, 2014

(54) INTELLIGENT SYSTEM AND METHOD FOR MITIGATING CYBER ATTACKS IN CRITICAL SYSTEMS THROUGH CONTROLLING LATENCY OF MESSAGES IN A COMMUNICATIONS NETWORK

(75) Inventors: John Erik Hershey, Ballston Lake, NY (US); Bruce Gordon Barnett, Niskiayuna, NY (US); Michael Joseph Dell'Anno, Clifton Park, NY (US); Daniel Thanos, Onterio (CA)

(73) Assignee: General Electric Company, Niskayuna, NY (US)

( * ) Notice: Subject to any disclaimer, the term of this patent is extended or adjusted under 35 U.S.C. 154(b) by 656 days.

(21) Appl. No.: 12/967,818

(22) Filed: Dec. 14, 2010

(65) Prior Publication Data

US 2012/0151589 A1 Jun. 14, 2012

(51) Int. Cl.
H04L 29/06 (2006.01)
(52) U.S. Cl.
USPC .......................................................... 726/24
(58) Field of Classification Search
USPC .......................................................... 726/24
See application file for complete search history.

(56) References Cited

U.S. PATENT DOCUMENTS 6,757,830 B1 * 6/2004 Tarbotton et al. ............. 713/188
7,246,156 B2   7/2007 Ginter et al.
2003/0023875 A1 * 1/2003 Hursey et al. ................. 713/201
2005/0081059 A1 * 4/2005 Bandini et al. ............... 713/201
2005/0283837 A1 * 12/2005 Olivier et al. ................... 726/24
2007/0079379 A1 * 4/2007 Sprosts et al. ................... 726/24
2008/0086773 A1 * 4/2008 Tuvell et al. ..................... 726/23
2009/0013374 A1 * 1/2009 Tsai ................................... 726/1
2010/0138066 A1   6/2010 Kong
2010/0169972 A1 * 7/2010 Kuo et al. ........................ 726/23
2010/0275265 A1 * 10/2010 Fiske et al. ....................... 726/26
2011/0184575 A1 * 7/2011 Kawamoto et al. ........... 700/292
2011/0184585 A1 * 7/2011 Matsuda et al. ............... 700/297
2011/0185196 A1 * 7/2011 Asano et al. ................... 713/300
2011/0208849 A1 * 8/2011 Barnett et al. ................. 709/223
2011/0219451 A1 * 9/2011 McDougal et al. ............. 726/23
2012/0047550 A1 * 2/2012 Lee et al. ........................... 726/1
2012/0054184 A1 * 3/2012 Masud et al. .................. 707/737

FOREIGN PATENT DOCUMENTS

WO    2009128905 A1    10/2009

OTHER PUBLICATIONS

Barnett et al., "Method and System for Security Maintenance in a Network", U.S. Appl. No. 12/712,831, filed Feb. 25, 2010.

* cited by examiner

*Primary Examiner* — Michael S McNally
(74) *Attorney, Agent, or Firm* — Nitin N. Joshi

(57) ABSTRACT

A system and method are provided for controlling the latency of messages to enable a network of devices to detect and respond to potential malware. The system and method receiving a message at a device and determining whether the message represents potential malware and requires a delay to allow time to detect and respond to potential malware. The amount of the delay associated with the message is determined and the message is processed based on the delay amount.

25 Claims, 11 Drawing Sheets

INTELLIGENT SYSTEM AND METHOD FOR MITIGATING CYBER ATTACKS IN CRITICAL SYSTEMS THROUGH CONTROLLING LATENCY OF MESSAGES IN A COMMUNICATIONS NETWORK

BACKGROUND

A modern society is served by utilities that must function properly at almost all times. Proper functioning is typically expressed by reliability, availability, accountability, and certifiability, the latter term meaning the ability of a user of a utility to actively query and learn the status of the utility. In order to meet the growing demands while providing reliability and efficiency, utilities, such as electric utilities, are developing and implementing technologies to create an intelligent infrastructure, such as a "smart grid" infrastructure of the power grid.

In order to realize an intelligent infrastructure, there must be an embedded or overlaid communications architecture by which components in the network structure can be accessed and controlled. Unfortunately, there is much ongoing, and indeed increasing, malicious cyber activity directed to harming the utility infrastructure. Trojan horses, viruses, and computer worms, for example, are often deployed and improved in order to disrupt the utility metering functions and other communications in the utility network.

In order to limit the potential damage of the cyber security threat, efforts are underway to enable awareness of potential threat events as well as their details and effects in order to harden the utility communication infrastructure both proactively and in response to incidents. The insinuation of malware, either by accident or design, has become commonplace. The effects of digital malware vary and the effects on the overall network's health and efficiency range from nuisance to minacious. The spectrum of the cyber malefactor's intentions is also expanding from simple to sophisticated hacking.

Smart Grid system architects and designers proceed to invest the system with a near optimal hardening against cyber security threats. Unfortunately the cyber security threat will continue to grow after the system design has been finished and the system evolves according to its design. While electronic modules are being developed to identify and neutralize some attacks, many situations continue to require human monitoring, human intuition, human decision, and human interaction to diagnose and counter new cyber hazards.

There is an important and often overlooked or underestimated consideration to the Human Machine Interface (HMI) and that is the speed and efficiency paradox. Communications continue to be forced to ever increasing transmission rates and lower latencies. The HMI is unable to participate in analysis and control of a message or series of messages requiring availability on the order of that required for protective relaying. As urgency diminishes, however, the availability requirements are relaxed for other message classes. In fact they may grow by as much as 8 orders of magnitude to days/weeks/months for collecting certain long-term data. There are, therefore, some message classes that can be forwarded with less urgency if necessary. For these message classes it would be best if there were alternatives between doing nothing and shutting down network propagation.

For these and other reasons, there is a need for the present invention.

BRIEF DESCRIPTION

A system and method are provided for controlling the latency of messages to enable a network of devices to detect and respond to potential malware. The system and method receiving a message at a device and determining whether the message represents potential malware and requires a delay to allow time to detect and respond to potential malware. The amount of the delay associated with the message is determined and the message is processed based on the delay amount.

BRIEF DESCRIPTION OF THE DRAWINGS

The nature and various additional features of embodiments of the invention will appear more fully upon consideration of the illustrative embodiments of the invention which are schematically set forth in the figures. Like reference numerals represent corresponding parts.

Figure 1:
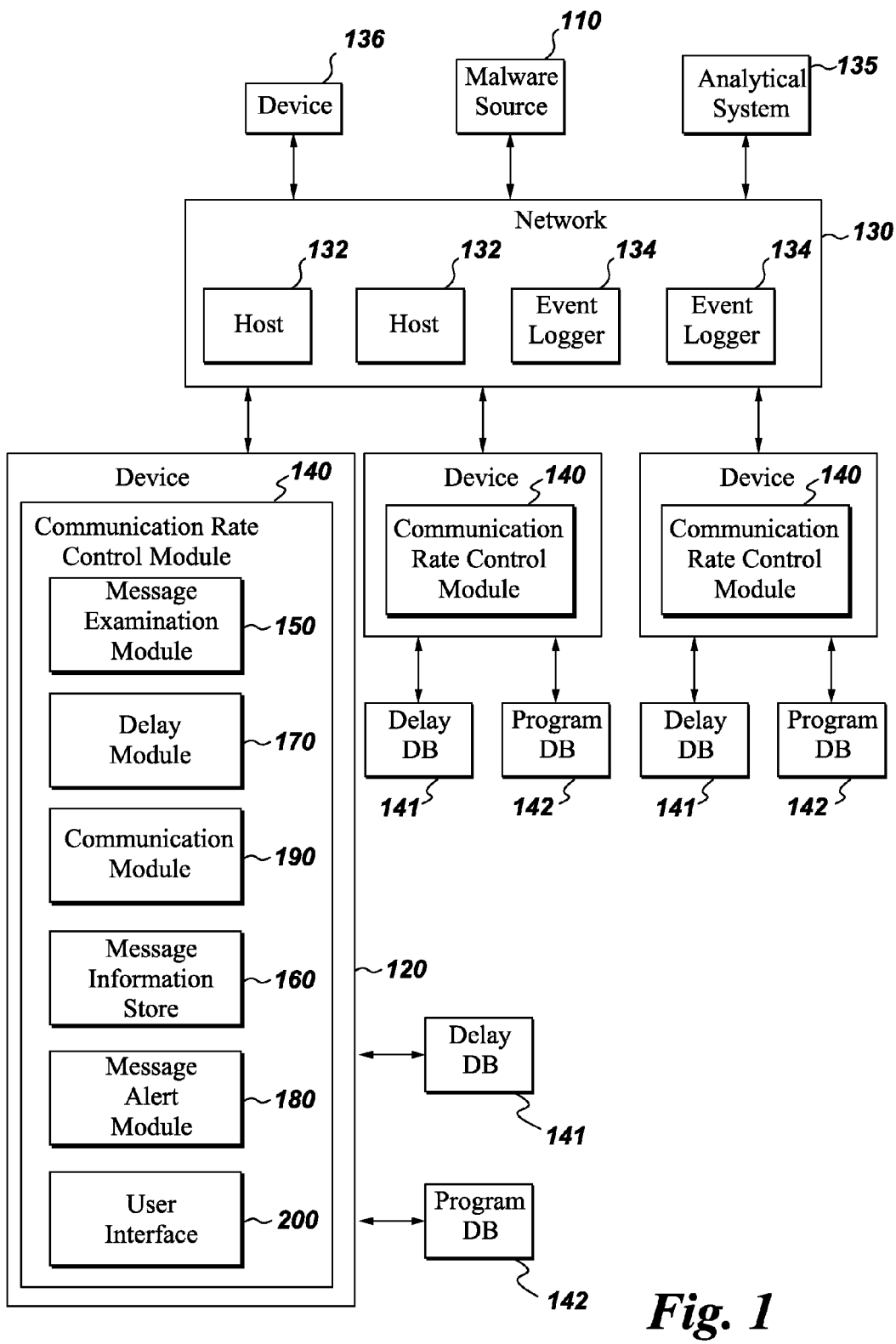
FIG. 1 illustrates a communication rate control system according to an exemplary embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to security maintenance in a network of power grid devices. While embodiments of the invention will be described in the context of energy or electric utility networks, it will be appreciated by those skilled in the art that the method and system can be used for other types of networks as well.

As used herein, the term "module" refers to software, hardware, or firmware, or any combination of these, or any system, process, or functionality that performs or facilitates the processes described herein.

Embodiments disclosed herein control message latency in order to provide time to determine whether a threat is present and to respond to those messages that present a potential threat. This will enable the HMI to participate actively and constructively in dealing with cyber threats, especially if the message latency could be occasionally selectively extended. In order to address the possibility of cyber threats, embodiments of the invention provide for a temporary reduction or throttling down of the communication propagation rate within the network for at least some message types or classes in order to accommodate the longer time constants of human reaction/action. Embodiments of the system and method enable communication rate throttling to allow time to perform analytics to determine whether there is a real threat and to respond to the event that's occurring.

In any large system there is usually a provision for a human to enter the command and control loops. A human can provide intuition that is not available from an electronic analytical engine, and a human can spot patterns of activity that may not be perceptible to an algorithm. However, the limitations of a human-in-the-loop are many. The speed of most human calculations is many orders of magnitude below an electronic computational circuit. A human exhibits a performance with a significant variance depending upon many variables, a significant number of which are environmental. But with a well-crafted HMI, a human can often be positioned to make quick and valuable judgments that will significantly augment the performance of automated analyzers and controllers.

A well-crafted HMI provides for cognitive design techniques including automating those tasks that slow down a human decision such as arithmetic intensive calculations, estimations, and comparison of parameters or calculation results to thresholds. A good HMI also arranges, prunes, and presents data in ways most easily grasped by a human operator. The HMI should be aware not only of system status through telemetry, it should also be aware of decisions made or not made by automated analyzers and controllers. Finally, the HMI should serve as a command portal for a human to order the network to commence or cease an extraordinary action.

Embodiments of the invention provide a communication rate control module that responds to a command sequence to reduce or re-establish the propagation rate of a particular message class. The Smart Grid network may host many communication rate control modules distributed throughout the network. The modules may be simply inserted within data lines or integrated into the front-ends of various communication components such as, for example and not by way of limitation, routers, switches, capacitor banks, meters, and reclosers.

An exemplary network communication rate control system according to an embodiment of the invention is shown in FIG. 1. The system 100 includes a potential malware source 110 coupled to devices 120, via a network 130. The network 130 may be wired, or wireless using such communications as the ZigBee, WiFi, WiMAX, HomePlug architectures, or a hybrid architecture comprising wired and wireless components. Communications between the devices 120, host devices 130, event loggers 140, and the coordinator 110 include the alerts, alarms, and infrastructure directives.

In some embodiments, the system includes an analytical system 135 to perform further analysis of incoming messages. This system gathers information about the network using mechanisms such as network monitoring, event log analysis, and HMI input. The network 130 includes host devices 132 and event loggers 134. In order to facilitate the description of the embodiments, a single malware source 110, and a small number of devices 120, host devices 132, and event loggers 134, are shown in FIG. 1. However, it should be understood that embodiments of the invention are not limited to these numbers, and that there can be any number of malware sources 110, devices 120, host devices 132, and event loggers 134 in the network. In another embodiment, the functionality of these devices may co-exist. For example, the host 132, event logger 134, and the device 120, may be multiple functions existing on a single host.

In the exemplary embodiment, the devices 120 are utility meters associated with utility customers. In other embodiments, the devices 120 can be substations, relays, distributed automated control, reclosers, line switches, and capacitor banks. The devices 120 can also include one or more honeypots. The devices 120 can be any devices found in a network environment.

In some embodiments, event loggers 134 receive information from the devices 120. They may store these messages and/or forward them to another device 135 and/136. They may retain a collection of log events, and allow other programs to examine these events for purposes of detection, correlation, and alarm notification. Results may be kept in a file, or a database. Other processes can examine these events, looking for specific events based on the device name reporting the event, timestamp, a pattern in the event message, etc. Some systems may have multiple event loggers, and others may use a centralized database that allows queries. Embodiments of this invention support distributed and centralized event loggers.

In this embodiment, each of the devices 120 includes a communication rate control module 140. The communication rate control module 140 includes a message examination module 150 that examines messages to determine whether they correspond to messages representing a potential cyber threat. The determination can be accomplished in a variety of methods. For example, the message type can be determined by analyzing some portion of an incoming packet to determine what kind of message it is, and then determine whether the identified message type requires a delay. There are many known methods to optimize and/or perform the decoding of information. Any suitable method can be used herein to decode the incoming messages. Some non-limiting examples of such messages include TCP or UDP packets sent to specific ports and/or IP addresses, or messages that contain data patterns associated with malware.

The communication rate control module 140 also includes a message information store 160 to store messages and/or corresponding information for messages or commands that appear out of the ordinary. A program database 142 is provided to store programs for processing messages that represent a potential cyber threat. In a non-limiting exemplary embodiment, the program database 142 could be implemented as a database server configured to store events that allows event correlation, for example. Another, non-limiting example includes a smaller, lightweight implementation that could be a memory-based or disk-based buffer designed to store messages to be transmitted. The device may also keep statistics that can characterize and identify patterns of usage, such as packet frequency, size, contents, or classification. A message alert module 180 is also provided to issue alerts to the network when a potential cyber threat is detected, such as a sudden increase in the frequency of packets by type, destination, size, destination port, etc. A communication module 190 is provided to communicate with the network and other devices. A user interface 200 is also provided to enable operator interaction. The system can also include an analytical system 135 that receives suspect messages via the network and performs analytics to determine more information about the potential cyber threat.

Figure 10:
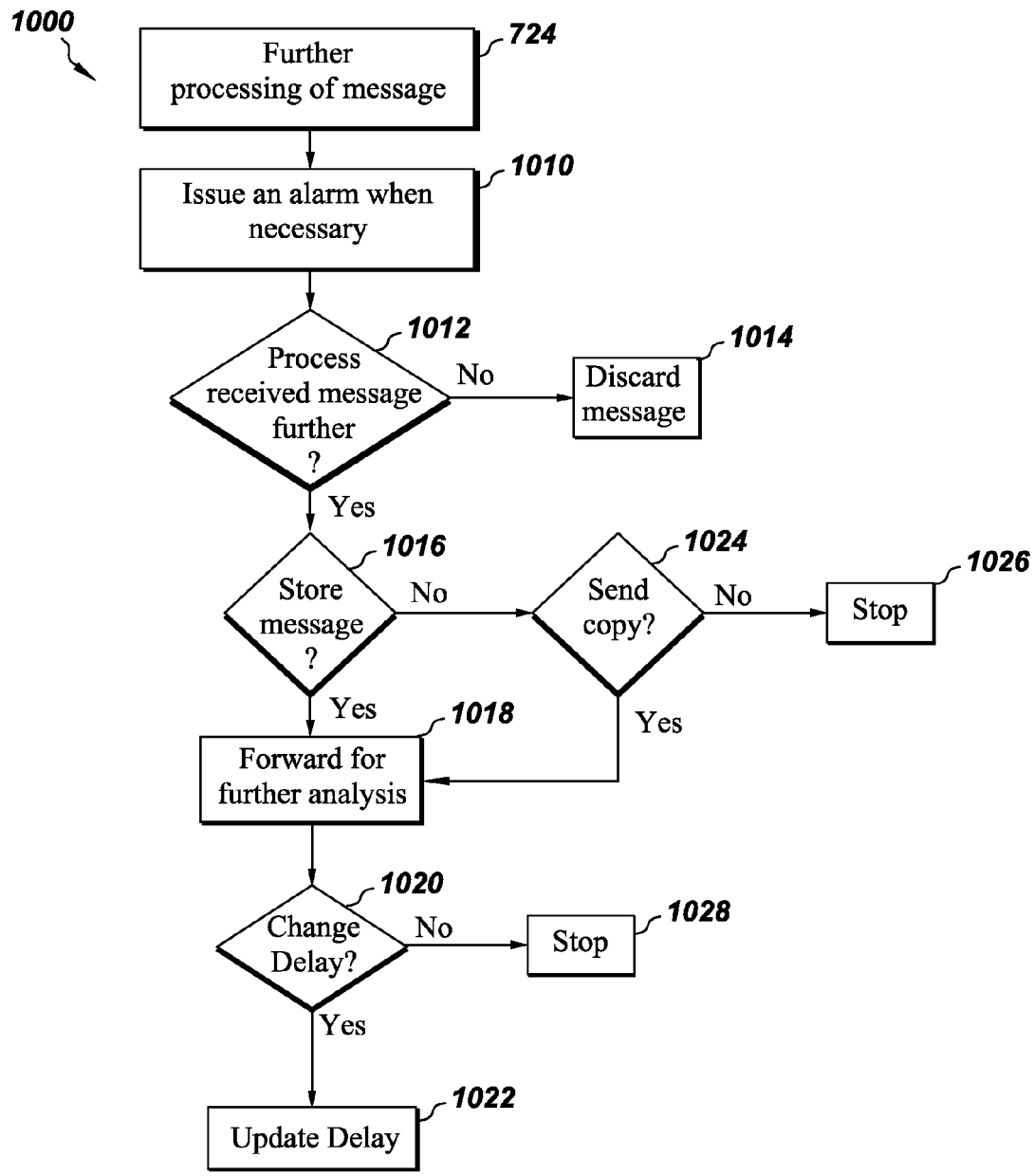
FIG. 10 illustrates an exemplary process for the step of further processing a message shown in FIG. 7.

The exemplary embodiment shown in FIG. 1 illustrates a distributed system where each device 120 includes a communication rate control module 140 to examine incoming messages, determine whether they match a list of identified messages representing cyber threats, determine the delay to apply when the incoming message matches a message in a delay database 141, and applying the delay to the message to slow down the propagation of the message in the network. The database may be implemented in many ways. A non-limiting example includes implementation as a commercial database, operating on a RAID disk system in a dedicated machine. Another non-limiting implementation could be a buffer in memory. FIG. 10 illustrates a non-limiting example of a memory-based database. A communication module 190 enables communication with a host 132 indicating that a received message is a potential cyber threat and that a delay has been applied to the message. An event logger 134 also receives information from the devices and stores them and/or forwards them to another device. The event loggers 134 may retain a collection of log events, and allow other programs to examine these events. The results can be maintained in a file or database. Other processes can examine these events, looking for specific events based on the device name reporting the event, timestamp, a pattern in the event message, etc. Some systems may have multiple event loggers, and others may use a centralized database that allows queries. Embodiments of this invention support distributed and centralized event loggers.

There are different ways decisions can be made as to when to insert a delay in a packet. Some non-limiting examples will be described. The decision can be made either locally (on the device that is sending or forwarding a packet), or on a device other than the device sending the packet. In a non-limiting example, a decision may be made on the device itself that may be caused by the packet matching a rule, such as all packets sent to IP address 10.1.2.3, and to TCP port 80. Another such rule could be "delay packets sent to the same destination IP address if the number of packets per minute exceeds 20," for example. In the case of the decision made on a remote device, an event correlation shows that the number of packets sent to a particular device exceeds 120 packets per minute. A single device may not notice this volume of traffic as it only sees packets traveling from its network interface. The rules may also be more sophisticated, such that the delay may be proportional to the packet rate. That is, the more often packets are received, the more of a delay is introduced. For example, if the expected maximum packet rate to a single destination is 10 packets a second received, then if the measured rate is 11 packets/second, the delay is 1 millisecond. If the incoming rate is 20, the delay is 5 milliseconds. If the incoming rate is 100 packets per second, then the delay could become 200 milliseconds. And if more packets arrive, the device can "drop the packets", making sure they are never transmitted.

Figure 2:
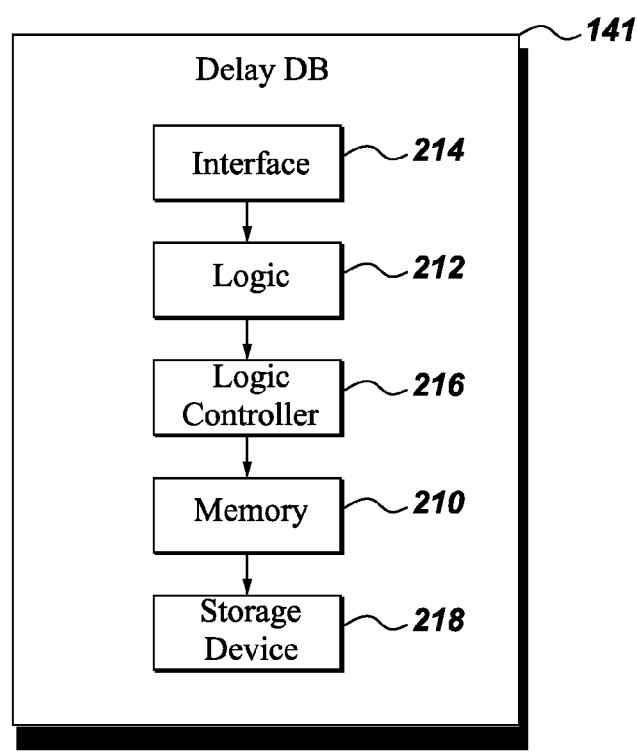
FIG. 2 illustrates a delay database according to an exemplary embodiment.

FIG. 2 illustrates an exemplary embodiment of the message delay database 141. The message delay database 141 includes primarily, and in some cases solely, of an archival unit or memory 210 and logic 212 including a search engine, and, secondarily and optionally, a communication origination unit or interface 214 and a logic controller 216. The memory 210 receives and stores delay amounts for messages that have been identified as representing a potential cyber threat, respectively. The message delay DB 141 can also include a storage device 218, such as a disk, an array of disks such as a RAID (Redundant Array of Inexpensive Disks), etc. The logic 212 and logic controller 216 respond to requests for retrieval of delay amounts for messages to apply communication rate throttling when necessary.

In some implementations, the device 120 may ignore an improper packet. Other implementations may keep track of the number of times malformed packets were received, and may report them to the event logger 134 and/or the message information store 160. Other implementations or embodiments can have the device 120 generate an alert or alarm via the message alert module 180, or report of receipt of an improper message via the communication module 190, which is sent to the event logger 134 when the packet is detected.

Figure 3:
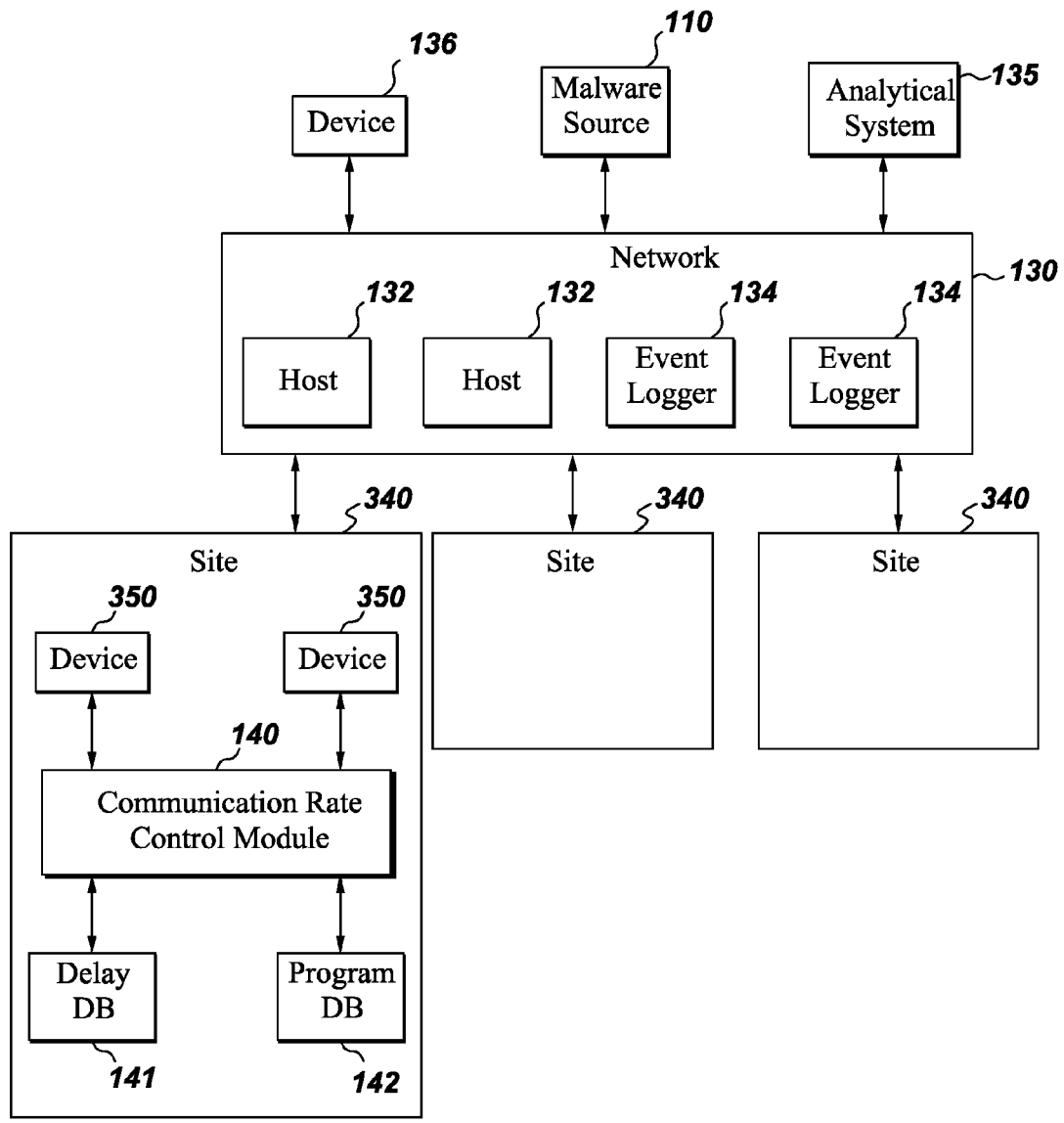
FIG. 3 illustrates a communication rate control system according to another exemplary embodiment.

FIG. 3 illustrates another exemplary embodiment. The system 300 in includes sites 340 having one or more devices 350, the communication rate control module 140, message delay database 141 and the program database 142. In this embodiment, multiple devices 350 at a site 340 are processed by one or more communication rate control modules 140.

Figure 4:
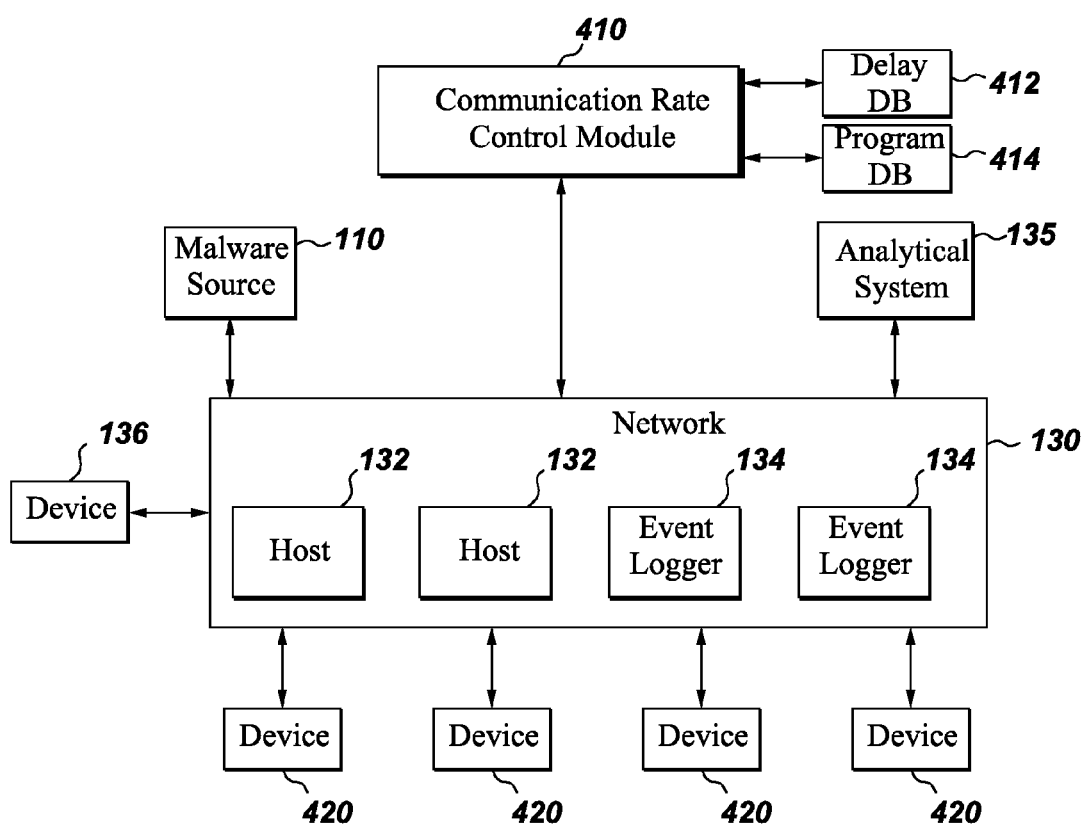
FIG. 4 illustrates a communication rate control system according to another embodiment.

FIG. 4 illustrates another exemplary embodiment including a centralized communication rate control module 410 having a program database 412 and a message delay database 414. The communication rate control module 410 is implemented in the same manner as the module 140. The communication rate control module 410 can be hosted by a utility or by any other third party. Multiple devices 420 communicate with the communication rate control module 410 via the network 130.

Figure 5:
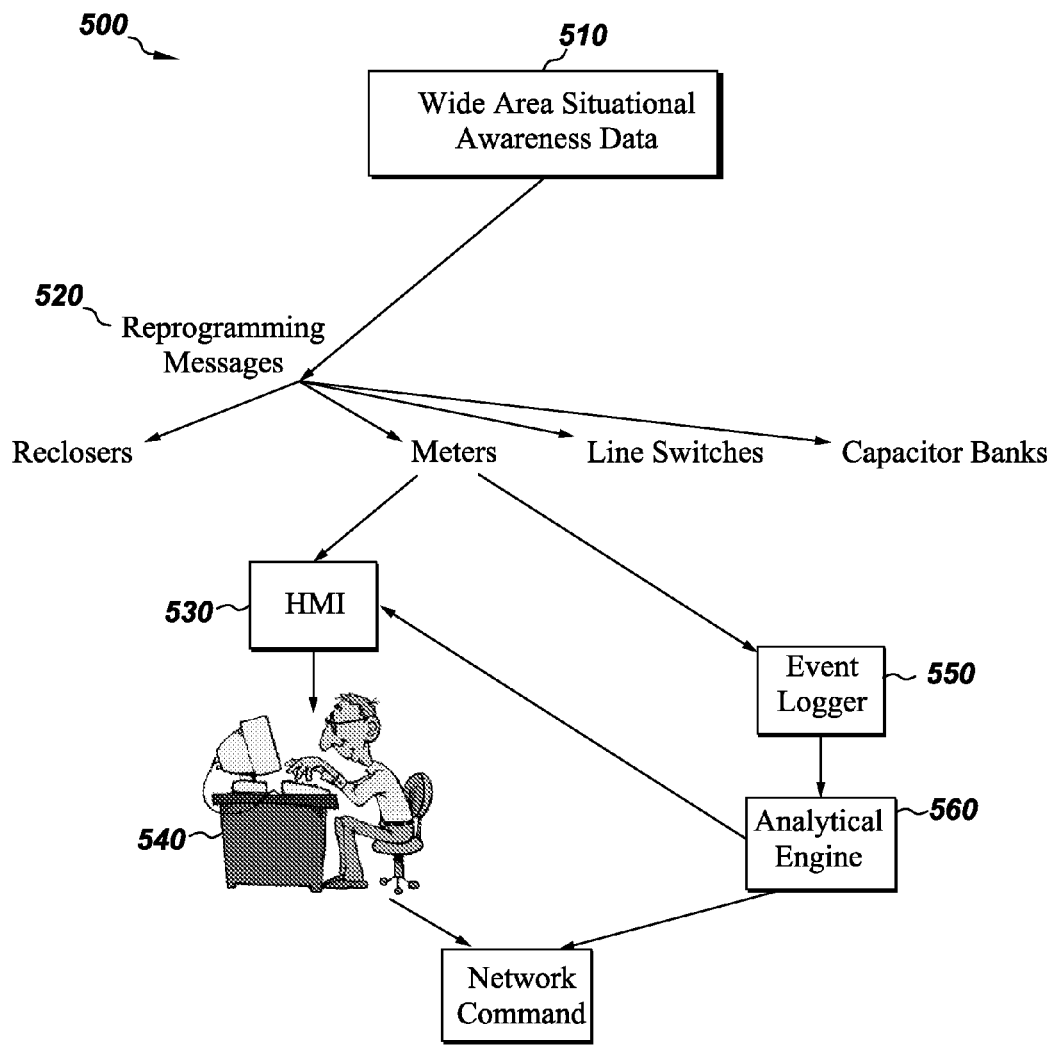
FIG. 5 illustrates an information flow according to an exemplary embodiment.

FIG. 5 illustrates an exemplary logical flow of communication in a network 500. Wide area situational awareness data of the Smart Grid is available from a portal 510. To facilitate explanation, the following illustrative and non-limiting example of the reporting of reprogramming messages sent to devices within the grid will be described. Reprogramming messages may be sent to many devices such as for example, and not by way of limitation, reclosers, meters, line switches, and capacitor banks. Reprogramming messages may be sent for many legitimate reasons such as, for example and not by way of limitation, to upgrade software, to fix or patch software shortcomings, and to select or delete electable options. Reprogramming messages may also be introduced by those seeking to hack, disable, damage, or otherwise adversely affect the functioning of the Smart Grid.

FIG. 5 shows the split-out of the reprogramming messages for meters and the reporting of them to the HMI 530 and an event logger 550. The event logger 550 may be responsible for many functions including the storage, sorting, summarization, and reporting of test results and anomalies to an analytical engine 560. The analytical engine 560 may also have many functions. For the instant, non-limiting example, the analytical engine 560 judges and reports meter malfunctions that seem associated with receipt and assimilation of one or more reprogramming messages. The analytical engine 560 may have a threat library and set of rules for responding to a message recognized to be a threat in much the same way as a computer user's anti-malware program functions for prophylaxis. Should the analytical engine 560 detect the presence of a reprogramming message that is a known threat, the analytical engine 560 may cause the network command module 570 to launch an appropriate command sequence into the Smart Grid network to neutralize the recognized threat message. If, however, the particular reprogramming message is not yet categorized as a threat, the message will be allowed to continue propagating within the Smart Grid network and wreaking increasing harm.

Figure 6:
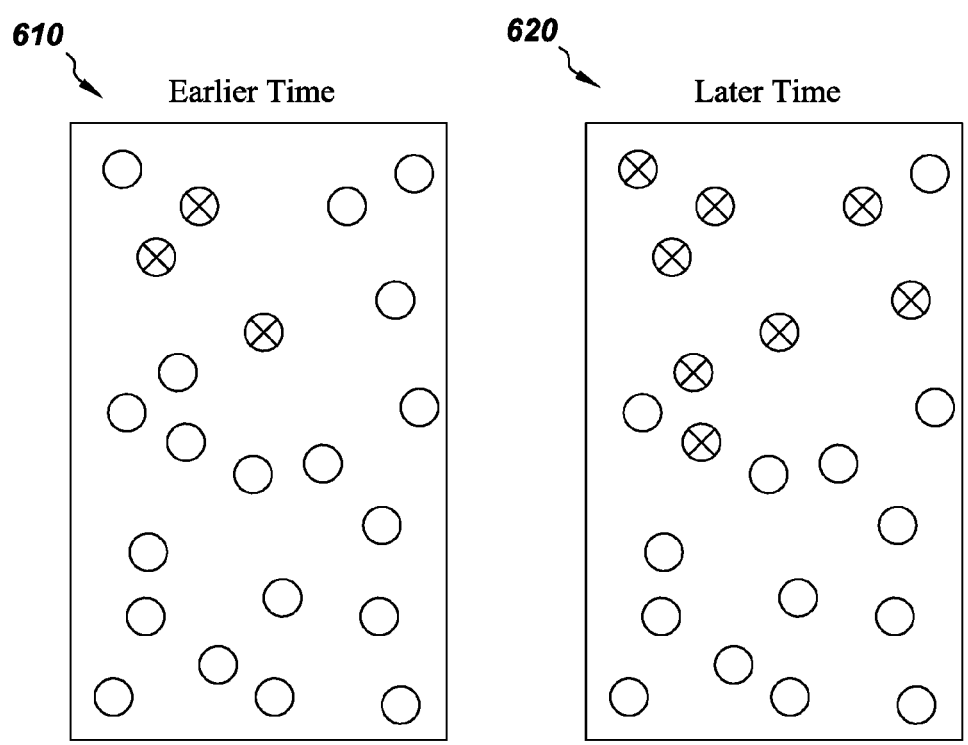
FIG. 6 illustrates an exemplary visual representation on a user interface according to an exemplary embodiment.

The analytical engine 560 also reports its analysis to the HMI 530 that serves the human operator 540. The human operator 540 may examine the specific problem of spreading meter malfunctions. FIG. 6 is an example of a display produced by the HMI 530 using data provided by the reprogramming messages 520 from the wide area situational awareness data 510 and results generated by the analytical engine 560. An earlier time map of meters 610 is displayed with a later time map of meters 620 and the human operator 540 can observe the extent of the problem and some of the characteristics of the problem's development. In this non-limiting example, the human operator 540 can see that the meter problem appears to be moving outwards forming a cluster, and the human operator 540 may determine that there may initially have been a meter infected with previously unknown and uncharacterized malware and that the infection is spreading without check. At this point the human operator 440 may cause the network command module 570 to launch an appropriate command sequence into a part or all of the Smart Grid network to slow down the propagation speed of all communications or only communications associated with meter reprogramming. Slowing down communications associated with meter reprogramming will allow the human network operators, such as human operator 540, to analyze the situation, isolate the malware, and update the threat library and corresponding rules of the analytical engine 560. After the problem has been resolved, the human operator 540 may cause the network command module 570 to launch an appropriate command sequence into a part or all of the Smart Grid network to return all communications, or only communications associated with meter reprogramming, to their normal propagation speed.

The message examination module 150 of the communication rate control module 140 may be implemented according to various embodiments. According to an exemplary embodiment, a list of message types and/or classes that represent a potential cyber threat can be stored in a message delay database 141. The message delay database 141 stores messages that have been identified as representing a potential cyber threat and the corresponding delay to apply to add latency and delay the propagation of the message. According to embodiments of the invention, the message examination module 150 searches the message delay database 141 to see if the received message type has been previously encountered and identified as a potential cyber threat. If the message type exists in the message database, a delay amount associated with the message type is retrieved and applied by the delay module 170. The message delay database 141 is updated as additional message types or classes are identified.

Another non-limiting example of the processing of the message examination module 150 includes performing the opposite processing. More particularly, the module 150 may determine that the message required a delay, and then determine the message type. By way of non-limiting example, for instance, there may be a command received at the device instructing that messages from a particular device 120 or devices 120 may require a delay, so if messages from this source or device 120 is received the message examination module 150 may further process the message to determine the message type, where some messages from the source are acceptable while others are not and require a delay. In this example, it is determined whether the message may require a delay (based on source device), and then the message type is determined for identifying whether and how long of a delay should be applied. Therefore, embodiments of the invention contemplate various implementations for processing messages to determine whether they represent a potential cyber threat and identify the appropriate delay to apply to further propagating the message in order to allow time for a determination to be made as to whether the message actually represents a cyber threat.

As a non-limiting example of a possible threat, the Slammer virus propagated so quickly, that it doubled in size every 8.5 seconds. If a network of devices waited for human interaction before throttling traffic, it may be too late to stop a widespread infection. Therefore, if decisions can be made on a single device, and it can slow down the propagation of malware, then this will increase the chances that the network of devices will remain operational. Since devices can make decisions automatically, the implementation of embodiments of the invention are such that insertions of small amounts of delay will not cause the network to become non-functional, only sluggish. When the decision is made to insert a delay into a packet, the delay may be slight, so that if a single packet is delayed, the impact is very small. The packet is still sent, so no information is lost and no packets are dropped. If the total numbers of delayed packets across several different devices are small, the total impact will be small. However, if there is a sudden change in network activity, such as that caused by a virus outbreak, or a compromised device, and the packets being sent by that device causes a rule to be triggered, then every device that delays packets from the compromised device could slow down all packets from that device. The result is that the compromised device will be throttled when it sends packets to other devices, which will in turn slow down any infection or attack. This in turn protects the rest of the network from a sudden increase in activity.

The communication rate control module 140 can be arranged at each individual device 120 or at devices acting like troll communication devices, for example, arranged in between other devices that provide instructions. These embodiments rest within the network stack of the device 120. For example, the module 140 can be on a router or a gateway, for example. In these arrangements, the communication rate control module 140 makes decisions having a larger impact because it's a point to a larger network.

The message examination module 150 determines whether an incoming message requires a delay since it has been identified as a potential cyber threat. There are many methods for identifying potential cyber threats, such as the methods disclosed in co-pending U.S. patent application Ser. No. 12/712, 831 entitled "Method and System for Security Maintenance in a Network," filed on Feb. 25, 2010. Embodiments of the invention apply to any method for identifying messages or communications as cyber threats and/or potential cyber threats. The determination can be based on any data or metadata found in the network stream and/or analytics coming from another source such as an analytical system, or activity that does not fit within a predefined pattern as dictated by a rules set, for example. In some embodiments, the message examination module 150 correlates analytic activity and information with the incoming network flow or data stream, then the dynamic communication rate throttling is based on this information. Another non-limiting examples include policy changes. For example, there may be a policy change instructing devices not to do any upgrades until further instructions. This is like a global policy that instructs devices to stop accepting messages of this type or don't do any updates. This may be considered an application specific communicate rate throttle. Essentially, the communication rate control module is throttling the propagation rate to zero (i.e., infinite delay) in this example. The amount of throttling applied is dependent upon the message type. Multidimensional decision based on all data or metadata that has to do with the packet or message stream. Embodiments of the invention provide for dynamic adjustment of communication flow pattern of traffic on the network in an intelligent manner in order to prevent an attack.

An alternative to throttling, the message examination module 150 may discard the packet. Also, as previously noted, the throttling itself could be occurring on a distributed basis, or on a centralized basis. For example, in smart meter environment which is more mesh, when an anomaly is detected, a broadcast message can be sent to all meters and instruct them, by way of non-limiting example, to go into self-defense mode such that if a message is received from a particular source, for example, either throttle the communication, block the communication with infinite delay, or discard. In some non-limiting exemplary embodiments, a self-defense mode may be a debug or test mode that is enabled sometimes and disabled some other times to deny messages of a particular type, such as diagnostic traffic. Or the priorities can be changed to throttle all traffic except diagnostic traffic, for example.

In other embodiments, a hybrid approach can be applied. For example, in a situation where a message corresponds to an infinite delay, the communication rate control module 140 may either discard the message or buffer the message. Essentially, the message can either be ignored (e.g., discarded) so that there is no delay or the message can be stored and/or forwarded to an analytical system for forensic analysis. As noted, in some embodiments, the communication rate control module 140 forwards the message that has been identified as a potential cyber threat to another device 136, for example, and that device 136 could be a honeypot, a forensic system, a honeynet, or any other collector, including the analytical system 135, for forensic or other purposes.

Embodiments disclosed herein identify how a network will deal with communications that have been identified as potential cyber threats. Embodiments provide for dynamically throttling or controlling the communication rate in the network when these communications are detected. Embodiments inject a delay before forwarding the message or packet through, but send packet through in a lower priority queue. This provides an alternative to blocking the network traffic altogether. This enables the a reduced propagation rate in order to give a human more time to go to an HMI and try to determine or identify the issue or problem without disrupting service right away. In this way, communications or packets are forwarded in a controlled way to minimize impact. The response could be automatic where a human is not involved. In some embodiments, the communication rate is throttled to allow time for human or operator to be involved, go to HMI and see what's going on, and allow time to make a decision on how to further process to essentially stop the potential threat from broadly spreading.

In some embodiments the communication rate control module 140 generates an alert via the message alert module 180 to provide notification to an operator and/or other devices that an event has occurred. For example, a device 120 itself detects a communication that presents a potential cyber threat and it sends an alert.

In those embodiments where the message examination module 150 detects a message identified as a potential threat and stores in the message information store 160 or some buffer (not shown), the information may be deleted and/or forwarded to another device such as an analytical system 135 based on human intervention providing commands or automatically. In some embodiments, a determination may be made to change the delay associated with a particular message and the delay database 141 is updated. This gives the delay module 170 more complexity and flexibility in how it reacts.

Embodiments disclosed herein provide for automatic protection against potential cyber threats by slowing down the network and provides the network with a mechanism to recover, for example by determining that a particular message represents a potential threat and requires that all of these types of messages be dropped, but allow all of the others to go through. Embodiments include those requiring human intervention, automatic or some hybrid of these. Automatic operation is based on some set of rules. Embodiments of the invention maintain the general reliability of the network.

Figure 7:
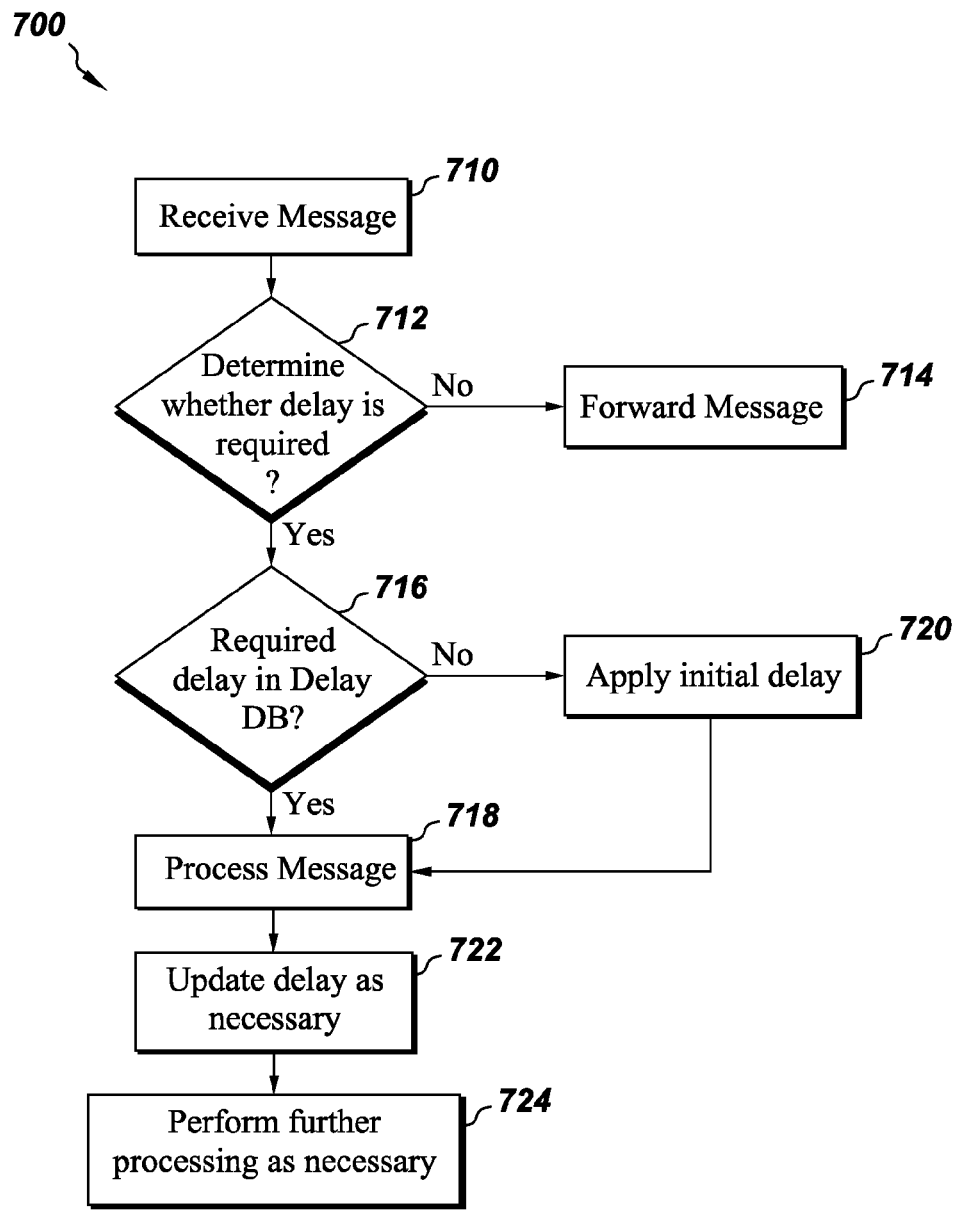
FIG. 7 illustrates a flow diagram of a communication rate control process according to an exemplary embodiment of the invention.

FIG. 7 shows a flow diagram for a communication rate control process according to an exemplary embodiment. In the process 700, a device receives an incoming message in step 710. In step 712, the message examination module 150 of the communication rate control module 140 determines whether a delay is required for the received message. If no delay is required, then processing continues to step 714 and the message is forwarded without delay. If a delay is required, then processing continues to step 716, where it is determined whether the delay required for this message is stored in the delay database 141. If the required delay is found in the database 141, then processing continues to step 718 where the delay is applied to the message throttle the message propagation time back or slow down the propagation of the message. If the delay is not found in the delay database 141 in step 716, then processing continues to step 720 where an initial delay is applied to the message. The initial delay can be a predetermined delay programmed into the delay module 170, or an appropriate delay can be determined and applied by the delay module 170, or some other suitable value can be used as the initial delay. Processing then continues to step 718 where the delay is applied to the message. In step 722, where the required delay for the message is updated in the delay database 141 as necessary. In step 724, the message examination module 150 determines whether further processing of the message is necessary.

Figure 8:
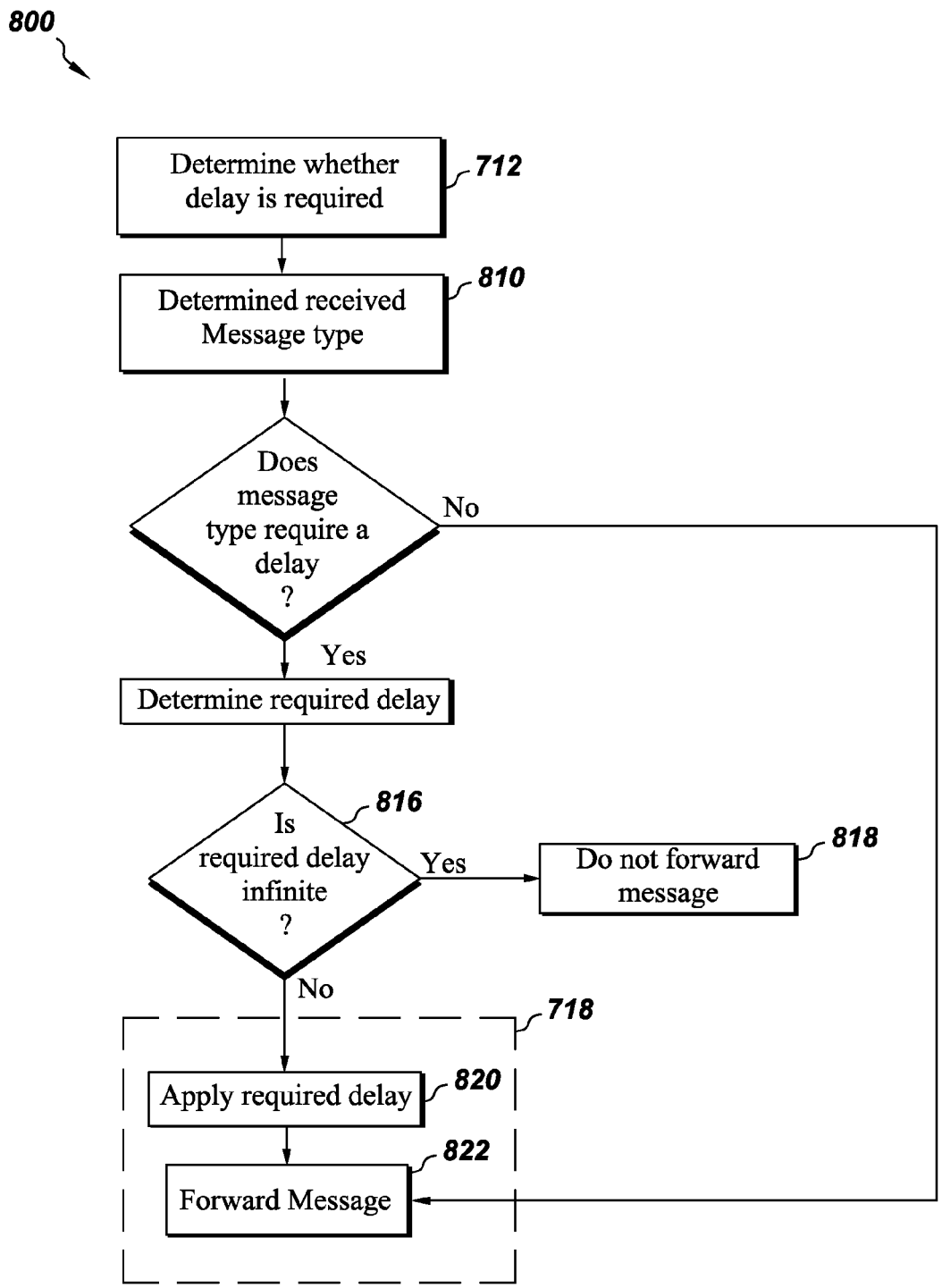
FIG. 8 illustrates an exemplary process for the step of determining whether a delay is required shown in FIG. 7.

FIG. 8 illustrates a flow diagram for determining whether a delay is required for the received message in step 712 shown in FIG. 7 according to an exemplary embodiment. The process 800, includes step 810, where the message examination module 140 of the communication rate control module 140 determines the message type of the incoming message. For example, the message type can be determined by analyzing some portion of an incoming packet to determine what kind of message it is, and then determine whether the identified message type requires a delay. There are many known methods to optimize and/or perform the decoding of information. Any suitable method can be used herein to decode the incoming messages. For example, packets may be identified by characteristics of the packer such as source and/or destination addresses, source and/or destination ports, messages that contain specific values in specific locations in the packet, or certain packet contents. Once the message type is determined in step 810, processing continues to step 812 where it is determined whether this type of message requires a delay. If the message does not require a delay, then processing continues to step 822 and the message is forwarded without delay. If the answer is yes in step 812, then processing continues to step 814 where the required delay for this message is determined from the delay database 141. In step 816 it is determined whether the delay is infinite. If the answer in step 816 is yes, then processing continues to step 818 and the message is not forwarded or blocked. If the answer in step 816 is no, the processing continues to step 820 where the required delay for the message is applied and the message is forwarded by the communication module 190 in step 822. In one non-limiting implementation, a delayed packet can be placed in an outgoing queue containing all outgoing messages, but a value is included to determine how much to delay the packet. One implementation can add the delay to the value that indicates the current time and date. This extra field is stored in the queue. The system could have a single queue for all outgoing messages, or two queues—one for packets with no delays, and one for packets with delays.

Figure 9:
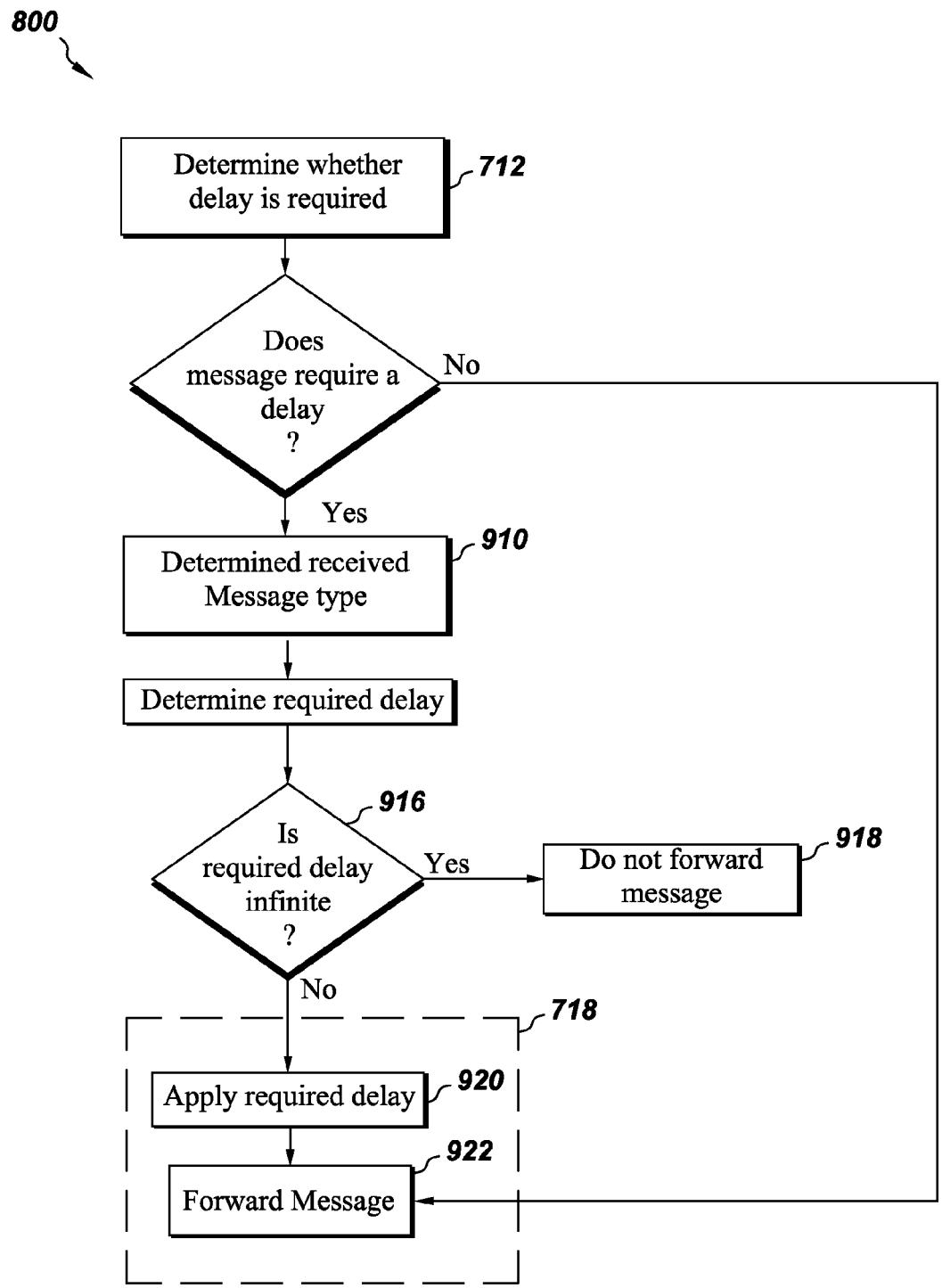
FIG. 9 illustrates another exemplary process for the step of determining whether a delay is required shown in FIG. 7.

FIG. 9 illustrates a flow diagram for determining whether a delay is required for the received message in step 712 shown in FIG. 7 according to another exemplary embodiment. The process 900 includes step 910 where the message examination module 150 of the communication rate control module 140 determined whether a delay is required for the incoming message. This may be determined by determining whether the message has been encountered before by comparing the message to messages stored in the delay database 141, for example. If the answer in step 910 is no, then processing continues to step 922 and the message is forwarded without delay. If the answer in step 910 is yes, the processing continues to step 912 where the message examination module 150 determines the type of message and determines the appropriate delay from the delay database 141 in step 914. In step 916, it is determined whether the required delay is infinite. If the answer in step 916 is yes, processing continues to step 918 and the message is not forward or blocked. If the answer in step 916 is no, then processing continues to step 920 where the delay module 170 applies the required delay for the message, and the message is forwarded by the communication module 190 in step 922.

FIG. 10 illustrates a flow diagram for further processing the message in step 724 shown in FIG. 7 according to an exemplary embodiment. The process 1000 includes step 1010 where the message alert module 180 issues an alarm when a message is received that requires a delay. Various embodiments for issuing the alarm are contemplated, including but not limited to, issuing an alarm when a particular type(s) of message is received, when a particular delay is required, as programmed, after a particular number of messages requiring a delay are received, etc. In step 1012, the message examination module 150 determines whether further processing of the message is required. If the answer in step 1012 is no, then the message can be discarded in step 1014. If the answer in step 1012 is yes, then processing continues to step 1016 where it is determined whether the message should be stored in message information store 160. If the answer in step 1016 is yes, then processing continues to step 1024 where the message examination module 150 determines whether to send a copy of the message to another device for further analysis. If the answer in step 1024 is no, then processing stops in step 1026. If the answer in step 1016 is no or the answer in step 1024 is yes, then processing continues to step 1018 where the message is forwarded to another device, such as the analytical system 135 or some other device 136 for further analysis and/or processing. In step 1020, the communication rate control module 140 determines whether the delay for the message should be changed. If the answer in step 1020 is no, the processing stops in step 1028. If the answer in step 1020 is yes, then processing continues to step 1022 and the delay in the delay database 141 is updated.

Figure 11:
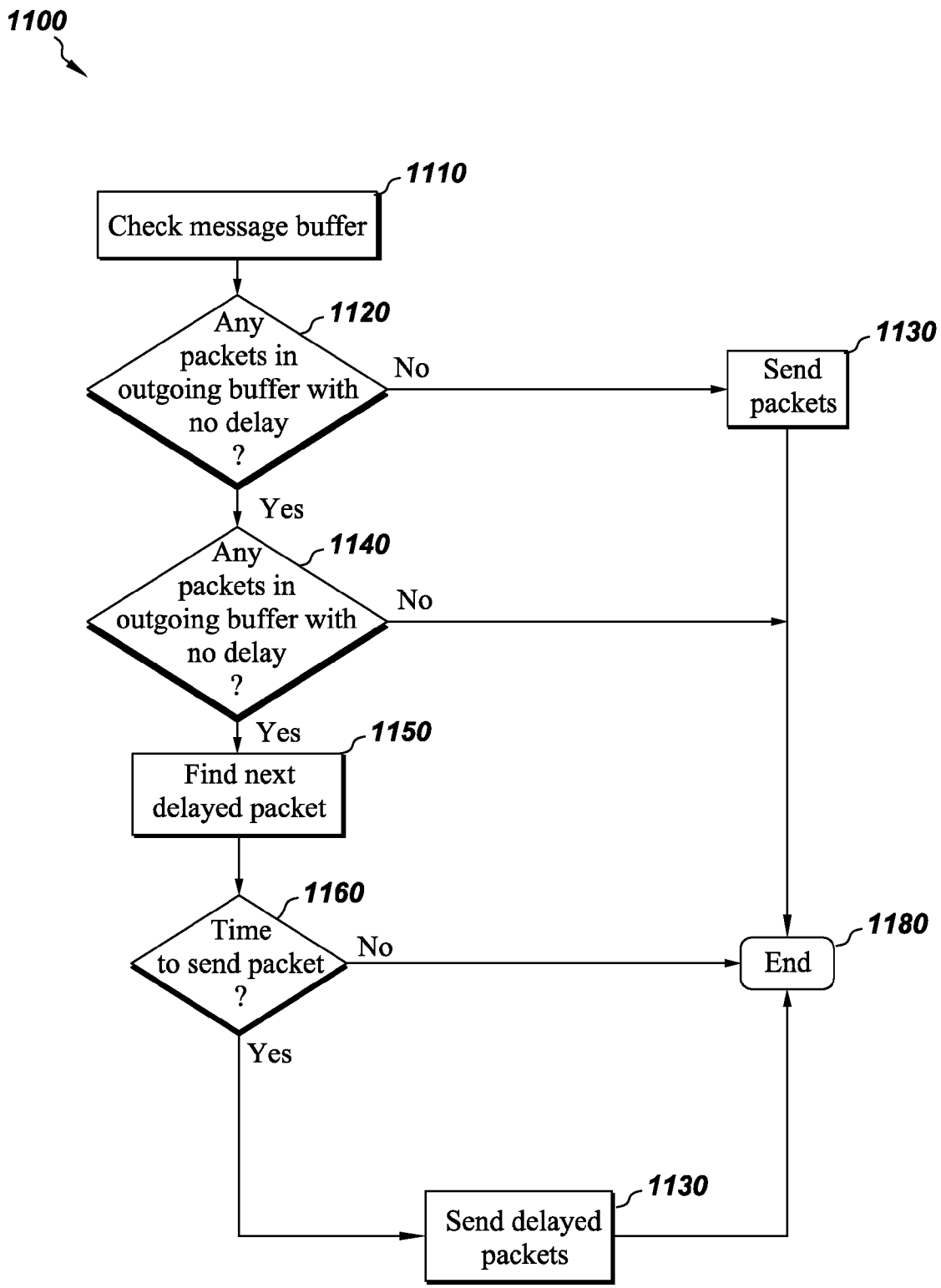
FIG. 11 illustrates an output message processing method according to an exemplary embodiment.

In FIG. 11, another non-limiting implementation is shown in the output message processing routine. In this example, the system called this routine to determine if there is a message to be transmitted. This can be explicitly called, or called asynchronously (such as a timer-based event). The system starts by examining the outgoing message buffer in step 1110. In step 1120, the system checks if there are any packets to be sent with no delays, and if such a packet is found it is sent in step 1130. Anyone knowledgeable in the design of software could also check for delayed packets first. Steps 1120 and 1140 can be executed in a different order. Next the system checks for packets that require a delay in step 1140. If so, processing continues to step 1150 where the system finds the packet to be sent. If not, then processing stops at step 1180. In step 1160, it is determined whether it is time to send the packet. If the answer in step 1160 is no, then processing ends at step 1180. If the answer in step 1160 is yes, then processing continues to step 1170 and the delayed packets are sent.

In one non-limiting implementation, a timestamp can be used associated with each message, and if the current time equals or exceeds the value of the timestamp, the system can therefore decide the time for the packet to be sent is less than or equal to the current time and day. The queue of delayed messages can either be sorted based on the timestamp, or some other mechanism can be used to identify the packet with the "smallest" timestamp, indicating it's the next one to be processed. If the value of the next packet is greater than the current date and time, the send message event can exit without sending any packets.

In summary explanation, exemplary embodiments of the invention provide a system and method for controlling the latency of messages in a network to enable further analysis of messages that potentially represent a cyber threat.

While some exemplary embodiments of the invention have been described in the context of a smart grid network, it will be appreciated by those skilled in the art that the method and system can be used in any communications network While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method, comprising:
   receiving a message at a power grid device;
   determining whether the message represents potential malware and requires a delay to allow time to detect and respond to potential malware;
   determining a delay amount for the delay associated with the message; and
   processing the message based on the delay amount;
   wherein processing the message comprises blocking the message if the delay amount is infinite.

2. The method of claim 1, further comprising:
   determining a message type associated with the message; and
   wherein determining whether the message requires a delay comprises determining whether the message type requires the delay.

3. The method of claim 2, wherein determining the delay amount for the delay associated with the message comprises:
   determining the delay amount associated with the message type of the message.

4. The method of claim 2, further comprises:
   reporting receipt of the message type.

5. The method of claim 2, wherein the message type comprises at least one of a message including TCP packets, UDP packets, or messages that contain data patterns associated with malware.

6. The method of claim 1, wherein processing the message comprises:
   applying the delay amount to the message; and
   forwarding the message.

7. The method of claim 1, wherein processing the message comprises:
   discarding the message.

8. The method of claim 1, wherein processing the message comprises:
   storing the message when the message requires a delay; and
   forwarding a copy of the message to an analytical system to analyze the message for potential malware.

9. The method of claim 8, further comprising:
applying the delay amount to the message; and
forwarding the message.

10. The method of claim 8, further comprising:
updating the delay amount based on the analysis of the message.

11. The method of claim 1, wherein processing the message comprises:
forwarding the message to an analytical system to analyze the message for potential malware.

12. The method of claim 1, further comprising:
issuing an alarm.

13. The method of claim 12, wherein the issuing comprises:
issuing the alarm when the delay for the message is above a predetermined threshold.

14. A non-transitory computer-readable medium comprising computer-readable instructions of a computer program that, when executed by a processor, cause the processor to perform a method, the method comprising:
receiving a message at a power grid device;
determining whether the message represents potential malware and requires a delay to allow time to detect and respond to potential malware;
determining a delay amount for the delay associated with the message; and
processing the message based on the delay amount;
wherein processing the message comprises blocking the message if the delay amount is infinite.

15. The non-transitory computer-readable medium of claim 14, further comprising:
determining a message type associated with the message; and
wherein determining whether the message requires a delay comprises determining whether the message type requires the delay.

16. The non-transitory computer-readable medium of claim 15, wherein determining the delay amount for the delay associated with the message comprises:
determining the delay amount associated with the message type of the message.

17. The non-transitory computer-readable medium of claim 15, further comprises:
reporting receipt of the message type.

18. The non-transitory computer-readable medium of claim 14, wherein processing the message comprises:
applying the delay amount to the message; and
forwarding the message.

19. The non-transitory computer-readable medium of claim 14, wherein processing the message comprises:
discarding the message.

20. The non-transitory computer-readable medium of claim 14, wherein processing the message comprises:
storing the message when the message requires a delay; and
forwarding a copy of the message to an analytical system to analyze the message for potential malware.

21. The non-transitory computer-readable medium of claim 20, further comprising:
applying the delay amount to the message; and
forwarding the message.

22. The non-transitory computer-readable medium of claim 20, further comprising:
updating the delay amount based on the analysis of the message.

23. A system, comprising:
power grid devices connected to a network;
a communication rate control module coupled to the power grid devices and the network; a delay database coupled to the communication rate control module for storing delay amounts associated with messages received by the power grid devices;
wherein the communication rate control module is configured to:
receive a message at a power grid device;
determine whether the message represents potential malware and requires a delay to allow time to detect and respond to potential malware;
determine a delay amount for the delay associated with the message; and
process the message based on the delay amount;
block the message if the delay amount is infinite.

24. The system of claim 23, further comprising:
an analytical system for receiving information from the communication rate control module for further analyzing the message.

25. The system of claim 23, wherein the power grid device includes utility meters, relays, reclosers, line switches, capacitor banks or honeypots.

* * * * *